Sept. 8, 1953          H. SINCLAIR          2,651,394
CHANGE-SPEED GEARING
Filed Oct. 12, 1949          2 Sheets-Sheet 1
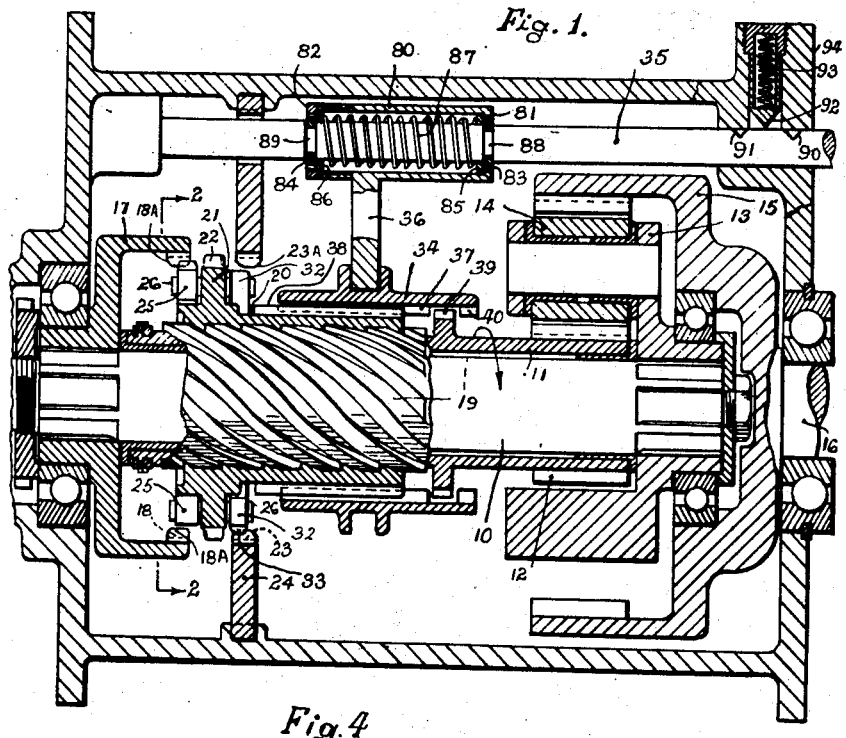
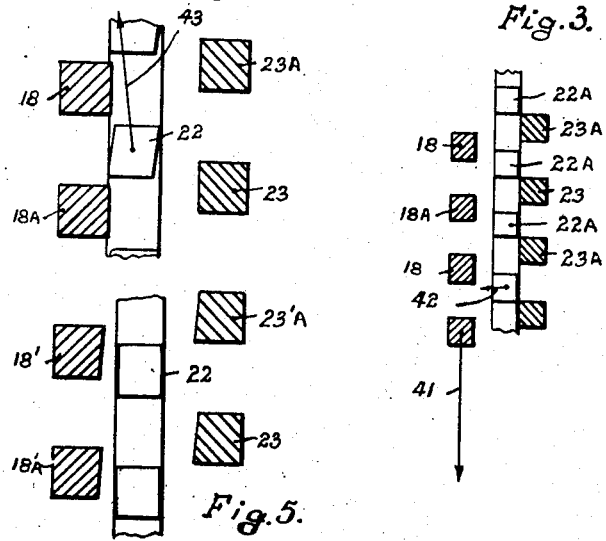
INVENTOR
*Harold Sinclair*
BY
ATTORNEYS Sept. 8, 1953  H. SINCLAIR  2,651,394
CHANGE-SPEED GEARING
Filed Oct. 12, 1949  2 Sheets-Sheet 2
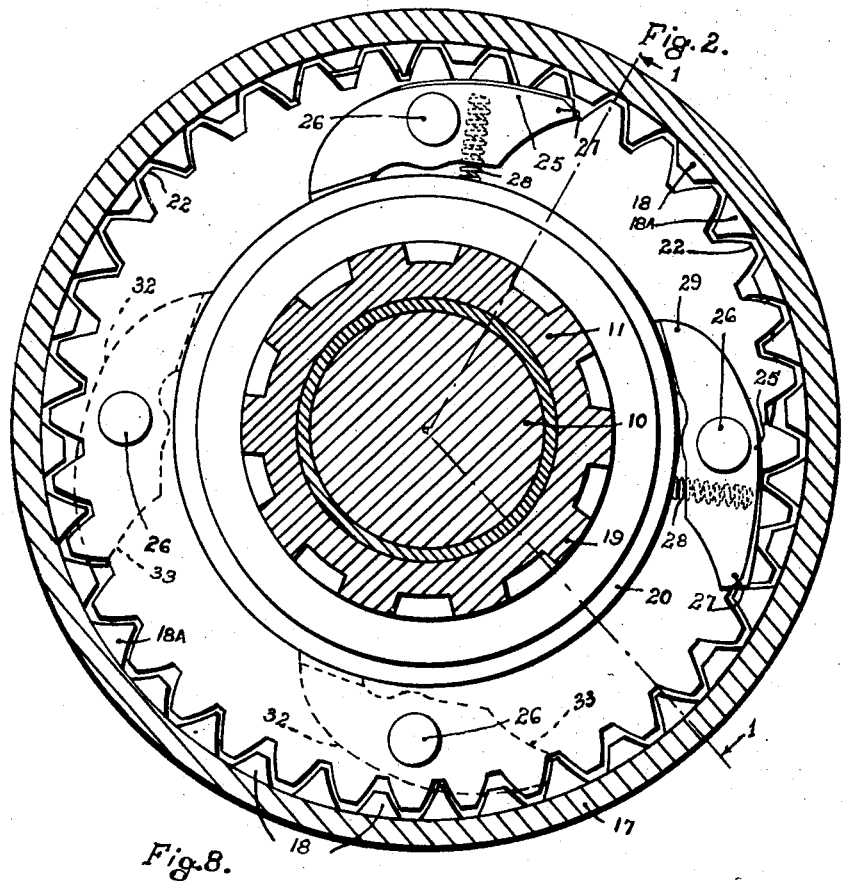
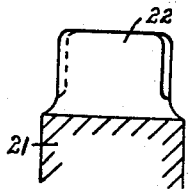
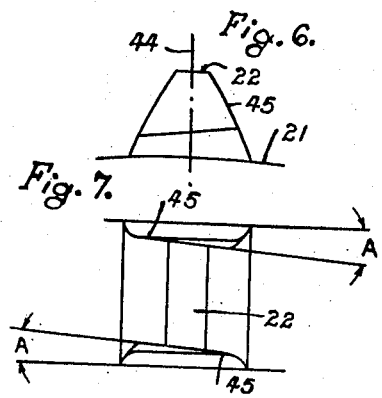
INVENTOR
Harold Sinclair
BY
Dean Fairbanks Hirsch
ATTORNEYS Patented Sept. 8, 1953

2,651,394

UNITED STATES PATENT OFFICE 2,651,394

CHANGE-SPEED GEARING

Harold Sinclair, London, England

Application October 12, 1949, Serial No. 120,919
In Great Britain November 29, 1948

4 Claims. (Cl. 192—48)

1

This invention relates to synchro-shifting clutch means suitable for use in selecting two alternative speed ratios in change-speed gearing, the clutch means being of the type including a first torque-transmitting member, a second torque-transmitting member coaxial with and rotatable relatively to the first member, a third torque-transmitting member co-axial with and rotatable relatively to the first and second members, an intermediate member so mounted on the first member as to be constrained to move helically thereon, the intermediate member having jaw-clutch teeth engageable, in consequence of such helical movement, alternatively with jaw-clutch teeth on the second member to establish a low-speed ratio and with jaw-clutch teeth on the third member to establish a high-speed ratio, and two subsidiary ratchet drives one of which is adapted to couple together the second and intermediate members and is so arranged as to effect engagement of the teeth of these two members without clashing on relative angular displacement of the first and second members in the direction in which they tend to move under driving torque, the other of said subsidiary ratchet drives being adapted to couple together the third and intermediate members and being so arranged as to effect engagement of the teeth of these two members without clashing on the relative angular displacement of the first and third members in the direction in which they tend to move under over-running torque. The clutch means may also include locking means operable to prevent helical movement of the intermediate member on the first member under the influence of driving torque when the intermediate member is in mesh with the third member. Such locking means may be dispensed with when the gearing is intended for use in circumstances where the direction of the torque load through the gearing when on the higher speed ratio is opposite to that when on the lower speed ratio, e. g. as in certain kinds of lifting or hauling mechanisms.

The present invention will be described with reference to the accompanying drawings, in which:

Figure 1 is a sectional side elevation of a planetary two-speed gear in general of known kind, but having its clutch means modified in accordance with this invention, the section being taken on the line 1—1 in Figure 2.

Figure 2 is a section taken on the line 2—2 in Figure 1.

Figure 3 is a diagram showing a development of

2 sets of jaw-clutch teeth as previously used in the kind of gear shown in Figures 1 and 2.

Figures 4 and 5 are diagrams corresponding to Figure 3, but drawn to a larger scale and illustrating two applications of the present invention.

Figure 6 is an end elevation of a jaw-clutch tooth employed in the gear shown in Figures 1 and 2.

Figures 7 and 8 are respectively a plan and a side elevation of the tooth shown in Figure 6.

The example of change-speed gearing shown in Figure 1 will be referred to in order to simplify the explanation of the problem with which the present invention is concerned. The gear shown in Figure 1 is suitable for use between an internal-combustion engine and another change-speed gear. The input shaft 10 of the gear passes through a sleeve 11 on which is formed a sun pinion 12. A planet carrier 13 is fixed to the input shaft and carries planet wheels such as 14. An annulus gear drum 15 is fixed to the output shaft 16. A drum 17 is provided with thirty-six uniformly-spaced jaw-clutch teeth constituted by eighteen teeth 18A of full depth alternating with eighteen shallow teeth 18 cut back to the pitch circle. This drum 17 is fixed to the input shaft 10 and forms the above-mentioned second member. The above-mentioned first member is constituted by the sun sleeve 11 which has right-handed helical splines 19 on its exterior. The above-mentioned intermediate member is a nut 20 engaged on the helical splines 19, and provided with a flange 21 having on its periphery thirty-six jaw-clutch teeth 22 engageable, when the nut is in its extreme left-hand position (as viewed in Figure 1), with the teeth 18 and 18A on the input drum 17, and, when the nut is in its extreme right-hand position, with eighteen full-depth and eighteen shallow jaw-clutch teeth 23A and 23 on a fixed ring 24 forming the reaction element of the gearing. On the front of the flange 21 are mounted four uniformly-spaced pawls 25 journalled on pins 26. Two of these pawls are omitted from Figure 2. Each pawl has a nose 27 which points forwards (i. e. in the normal direction of rotation of the input shaft) and which is biased outwards by a helical spring 28. Each pawl also has a tail 29 adapted to bear on the body of the nut 20 and thus limit the outward displacement of the nose. When the nut is in its mid position as shown in Figure 1, the pawls 25 are in register with the deep teeth 18A and are thus in a position to co-operate with them (as shown in Figure 2).

On the rear of the flange 21 are mounted on the pins 26 four pawls 32 the noses 33 of which trail with respect to the forward direction of rotation. Two of the pawls 32 are shown in broken lines in Figure 2, at the places where two of the pawls 25 have been omitted. These pawls co-operate with the deep teeth 23A.

The nut is capable of being locked in both of its end positions by means of a sleeve 34 adapted to be slid axially by preselector control means including a slidable rod 35 and a yoke 36 resiliently coupled thereto. The locking sleeve 34 has internal axial splines 37 engaged with splines 38 on the nut and engageable only when the nut is in its extreme right-hand position with splines 39 on the sleeve 11. The locking sleeve is provided also with splines 40 which are staggered circumferentially with respect to the splines 37 and are engageable with the splines 39 only when the nut is in its extreme left-hand position.

The yoke 36 has a tubular boss 80 provided at its ends with inturned flanges 81 and 82 which normally register with collars on the rod 35. These collars are in the form of snap rings 83 and 84 engaged in grooves 88 and 89 in this rod. Washers 85 and 86, which are an accurate sliding fit on the rod 35 and within the boss 80, are urged apart by a relatively light compression spring 87 to co-operate with the flanges 81 and 82 and with the collars 83 and 84. The rod 35 is provided with two notches 90 and 91 co-operating with a locating plunger 92 slidable in a bore in the gear case 94 and loaded by a relatively stiff compression spring 93.

When the nut 20 is in the left-hand position with its teeth 22 in mesh with the teeth 18 and 18A, low speed (direct drive) is established, and when the nut is in its right-hand position with its teeth 22 in mesh with the teeth 23 and 23A, high speed (overdrive) is established.

Gears of the kind in question, under certain conditions of use, may be liable to wear at the corners of the jaw-clutch teeth, in spite of the fact that the pawls ensure their smooth interengagement upon synchronisation and that in consequence there should apparently be no occasion for overloading of the tooth corners. For reasons concerned with manufacturing tolerances, it is convenient to allow appreciable angular backlash between the engaged jaw-clutch teeth of such gears, and I have discovered that this may give rise, during gear changes from the high- to the low-speed ratio, to an occasional momentary condition of the intermediate member which will be termed "shuttling." In explanation of the occurrence of this condition, the gearing shown in Figures 1 and 2 will be assumed to have its driving shaft 10 connected by a hydraulic turbo-coupling to an internal-combustion engine in a motor vehicle. It will further be assumed that the high-speed gear is engaged, and that the engine is developing driving torque and running at a speed well below its maximum. In order to change to the low-speed ratio, locking sleeve 34 is urged to the left and the engine torque is momentarily interrupted (e. g. by breaking the engine ignition circuit for an instant) to eliminate the torque from the locking sleeve, which thereupon moves to an unlocked position such that the nut 20 is free to move helically on sleeve 11. As the engine accelerates very rapidly, being free of load and under full torque, planet-carrier 13 rigid with the driving shaft 10 begins to rotate faster than annulus gear 15 fixed to the output shaft 16, and sun sleeve 11 begins to rotate forwards and screws nut 20 to the left until its teeth 22 disengage from stationary teeth 23. This condition is illustrated in Figure 3, where nut teeth 22A of known form are shown in place of the nut teeth 22 of Figures 1 and 2, and where the arrow 41 represents the velocity of the teeth 18 and 18A relative to the stationary teeth 23 and 23A, the velocity of the nut teeth 22A in this condition relative to the stationary teeth 23 and 23A being represented by the arrow 42 in Figure 3. The nut 20 now begins to rotate in the forward direction while its inertia carries it axially to the left. The nut teeth 22A will therefore attempt to enter the path of the faster rotating teeth 18 and 18A. Now if the teeth are shaped to provide appreciable backlash when fully engaged, it may happen that, after the trailing edges of teeth 18 and 18A have advanced in the circumferential direction beyond the leading edges of nut teeth 22A, the nut continues to move to the left into very slight premature meshing with teeth 18 and 18A until the leading edges of the latter teeth catch up with the trailing edges of nut teeth 22A, whereupon the two sets of teeth may come into contact corner to corner, with the result that the impact accelerates the nut. This acceleration moves the nut axially to the right along helical splines 19, and the leading corners of nut teeth 22A may similarly impact against the opposite corners of teeth 23 and 23A, the impact suddenly retarding the nut which in consequence will move axially to the left. This shuttling action may be repeated before the speed of rotation of the nut tends to exceed that of the driving shaft, whereupon a tooth 18A is engaged by a pawl 25 and the nut teeth are guided without clashing into full meshing engagement with teeth 18 and 18A.

Such shuttling motion may cause the corners of the jaw-clutch teeth to become chamfered, which increases the chances that teeth will impact corner to corner, so that the rate of wear is increased.

Such wear has been observed when a friction clutch forms part of the transmission line, either in series or in parallel with the change-speed gearing, and when its operation imposes very rapid accelerations to the intermediate member relative to the first member.

The object of this invention is to reduce or overcome this difficulty.

According to this invention, in synchro-self-shifting clutch means of the kind hereinbefore specified, the sides of the teeth of at least one of two interengageable sets of said jaw-clutch teeth are inclined, not necessarily over their whole width, in such a manner that the corners liable to the impact hereinbefore described are set back in the axial direction as compared with the corners not liable to such impact. The length and degree of inclination of the sides of the teeth should be such that only a glancing contact as contrasted with a corner-to-corner impact can occur between the cooperating teeth in the circumstance above described. Thus, for example, in the gearing shown in Figures 1 and 2, the right-hand and left-hand sides of nut teeth 22, when arranged in accordance with this invention, are inclined on part or all of their width in such a manner that the inclined portions lie on left-handed helices about the axis of rotation, as shown in Figure 4, where the modified teeth are denoted by 22, and the arrow 43 represents the velocity of these teeth relative to the teeth 18 and 18A.

As an alternative, or in addition, to inclining the sides of the nut teeth, the right-hand ends of the low-speed teeth and the left-hand ends of the high-speed teeth may be inclined on part or all of their width to lie on left-handed helices, as shown in Figure 5, where the modified low-speed teeth are denoted by 18' and 18'A, and the modified high-speed teeth by 23' and 23'A.

It is to be understood that Figures 3, 4 and 5 are merely diagrammatic. Figures 6, 7 and 8 show a preferred form of the teeth 22 in the gear shown in Figures 1 and 2. The teeth are of involute form, with a pressure angle of 30°. The inclined end faces are machined by a cylindrical cutter set with its axis parallel to the centre line 44 of the tooth and having a radius of $\frac{1}{32}$ inch. The cutter is operated to run out of the tooth in such a manner as to remove no metal at the pitch line on the corners 45. The profile of the teeth 18, 18A, 23 and 23A is complementary to that of the teeth 22. The backlash in the circumferential direction may be, for example, 0.035 to 0.045 inch on a pitch circle diameter of 7 in.

I claim:

1. Synchro-self-shifting clutch means suitable for use in selecting two alternative speed ratios in change-speed gearing, the clutch means being of the kind including a first torque-transmitting member, a second torque-transmitting member co-axial with and rotatable relatively to the first member, each of said members having jaw-clutch teeth, a third torque-transmitting member co-axial with and rotatable relatively to the first and second members, an intermediate member so mounted on the first member as to be constrained to move helically thereon, the intermediate member having jaw-clutch teeth engageable, in consequence of such helical movement, alternatively with jaw-clutch teeth on the second member and with jaw-clutch teeth on the third member, and two subsidiary ratchet drives one of which is adapted to couple together the second and intermediate members and is so arranged as to effect engagement of the teeth of these two members without clashing on relative angular displacement of the first and second members in one direction, the other of said subsidiary ratchet drives being adapted to couple together the third and intermediate members and being so arranged as to effect engagement of the teeth of these two members without clashing on the relative angular displacement of the first and third members in one direction, characterized by the feature that in each two interengageable sets of said jaw-clutch teeth at least those sides of one set are inclined which are nearer to the other set in such a manner that the corners liable to impact with the teeth of the other set are set back in the axial direction as compared with the other corners of the inclined sides, those sides of the teeth of the other set which are nearer to said one set being normal to the axis of rotation of the said members.

2. Clutch means as claimed in claim 1, and also including locking means operable to prevent helical movement of the intermediate member on the first member under the influence of driving torque when the intermediate member is in mesh with the third member.

3. Clutch means as claimed in claim 1, wherein both sides of the jaw-clutch teeth of the intermediate member are inclined in the manner set forth, and those sides of the teeth of said second and third members which are nearer to said intermediate member are normal to the axis of rotation of said members.

4. Clutch means as claimed in claim 1, wherein those sides of the jaw-clutch teeth of the second member which are nearer to said third member, and those sides of the jaw-clutch teeth of the third member which are nearer to said second member are inclined in the manner set forth, and wherein both sides of the jaw-clutch teeth of said intermediate member are normal to the axis of rotation of said members.

HAROLD SINCLAIR.

References Cited in the file of this patent

UNITED STATES PATENTS

| Number | Name | Date |
| --- | --- | --- |
| Re. 22,265 | White | Feb. 9, 1943 |
| 2,224,322 | Sinclair | Dec. 10, 1940 |
| 2,245,017 | Sinclair | June 10, 1941 |
| 2,251,342 | Rauen | Aug. 5, 1941 |
| 2,403,594 | Gilliard | July 9, 1946 |